United States Patent
Floury et al.

(10) Patent No.: US 11,582,578 B2
(45) Date of Patent: Feb. 14, 2023

(54) ASYNCHRONOUS SYNCHRONIZATION WITH A MOBILE COMMUNICATION NETWORK

(71) Applicant: Orange, Issy-les-Moulineaux (FR)

(72) Inventors: Cedric Floury, Chatillon (FR); Francois Toutain, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 953 days.

(21) Appl. No.: 16/348,025

(22) PCT Filed: Oct. 11, 2017

(86) PCT No.: PCT/FR2017/052793
§ 371 (c)(1),
(2) Date: May 7, 2019

(87) PCT Pub. No.: WO2018/087440
PCT Pub. Date: May 17, 2018

(65) Prior Publication Data
US 2019/0316910 A1    Oct. 17, 2019

(30) Foreign Application Priority Data
Nov. 8, 2016   (FR) ...................................... 1660782

(51) Int. Cl.
H04W 4/029    (2018.01)
H04B 17/309    (2015.01)
(Continued)

(52) U.S. Cl.
CPC ........... *H04W 4/029* (2018.02); *B64C 39/024* (2013.01); *G01C 21/20* (2013.01);
(Continued)

(58) Field of Classification Search
CPC ....... H04W 4/02; H04W 4/021; H04W 4/023; H04W 4/025; H04W 4/029; H04W 64/00;
(Continued)

(56) References Cited

U.S. PATENT DOCUMENTS 8,983,682 B1    3/2015  Peters et al.
10,034,209 B1 *  7/2018  Nandan ............... H04B 7/18504
(Continued)

FOREIGN PATENT DOCUMENTS

CN    101155371 A    4/2008
CN    103051680 A    4/2013
(Continued)

OTHER PUBLICATIONS

English translation of the Written Opinion of the International Searching Authority dated Dec. 18, 2017 for corresponding International Application No. PCT/FR2017/052793, filed Oct. 11, 2017.
(Continued)

*Primary Examiner* — Kevin D Mew
(74) *Attorney, Agent, or Firm* — David D. Brush; Westman, Champlin & Koehler, P.A.

(57) ABSTRACT

A control method implemented by a communication device. The control method includes: acquiring a current location and current capacities of a drone; selecting a destination point that can be reached by the drone according to the location and capacities thereof, the destination point being located in the coverage area of a point of access to a mobile communication network; and providing the drone with instructions specifying the destination point towards which the drone is to travel and communication operations to be carried out in connection with the mobile communication network. Once the instructions are obtained, the drone moves towards the destination point and performs the communication operation as soon as it reaches the destination
(Continued)

point or as soon as the connection quality reaches a satisfying level.

15 Claims, 3 Drawing Sheets

(51) Int. Cl.
B64C 39/02 (2023.01)
G01C 21/20 (2006.01)
H04B 7/185 (2006.01)
H04W 64/00 (2009.01)
H04W 84/00 (2009.01)
H04W 84/06 (2009.01)

(52) U.S. Cl.
CPC ....... H04B 7/18504 (2013.01); H04B 17/309 (2015.01); H04W 64/003 (2013.01); H04W 84/005 (2013.01); H04W 84/06 (2013.01)

(58) Field of Classification Search
CPC . H04W 64/003; H04W 84/005; H04W 84/06; H04B 17/309; H04B 7/18504; H04B 7/18506; B64C 39/024; G01C 21/20
See application file for complete search history.

(56) References Cited

U.S. PATENT DOCUMENTS

| | | | | |
|---|---|---|---|---|
| 10,212,494 | B1* | 2/2019 | Struhsaker | H04W 88/10 |
| 10,461,421 | B1* | 10/2019 | Tran | H01Q 3/46 |
| 2007/0284474 | A1 | 12/2007 | Olson et al. | |
| 2008/0076449 | A1 | 3/2008 | Joo | |
| 2010/0095065 | A1 | 4/2010 | Gray et al. | |
| 2015/0120094 | A1* | 4/2015 | Kimchi | G06Q 30/0641 701/3 |
| 2015/0236778 | A1 | 8/2015 | Jalali | |
| 2015/0379874 | A1* | 12/2015 | Ubhi | G01S 5/0027 701/3 |
| 2016/0068264 | A1* | 3/2016 | Ganesh | G06Q 30/0635 701/4 |
| 2016/0225264 | A1* | 8/2016 | Taveira | G08G 5/0026 |
| 2016/0238692 | A1 | 8/2016 | Hill | G06F 3/14 |
| 2017/0013476 | A1* | 1/2017 | Suthar | H04W 4/30 |
| 2017/0092109 | A1* | 3/2017 | Trundle | G05D 1/0011 |
| 2017/0123426 | A1* | 5/2017 | Hill | G05D 1/0278 |
| 2017/0242431 | A1* | 8/2017 | Dowlatkhah | G05D 1/0027 |
| 2017/0337511 | A1* | 11/2017 | Shroff | H04W 4/029 |
| 2018/0038695 | A1* | 2/2018 | Bitra | G08G 5/0021 |
| 2018/0152909 | A1* | 5/2018 | Hanes | H04W 4/40 |
| 2018/0247421 | A1* | 8/2018 | DeAngelis | G01S 5/02 |
| 2018/0294871 | A1* | 10/2018 | Kosseifi | H04W 4/026 |
| 2018/0316603 | A1* | 11/2018 | Boucadair | H04L 41/5025 |

FOREIGN PATENT DOCUMENTS

| | | | | |
|---|---|---|---|---|
| CN | 104703120 A | | 6/2015 | |
| CN | 205665905 U | | 10/2016 | |
| EP | 2938117 A1 | | 10/2015 | |
| WO | WO-2016122780 A1 | * | 8/2016 | .......... B64C 39/024 |
| WO | WO-2019133048 A1 | * | 7/2019 | .......... H04B 17/318 |

OTHER PUBLICATIONS

Notification according to Article 94 dated Jan. 25, 2021 for corresponding European Application No. 17 794 369.3.
English translation of Chinese Office Action dated Feb. 26, 2021 for corresponding Chinese Application No. 201780081975.3.
International Search Report dated Dec. 18, 2017 for corresponding International Application No. PCT/FR2017/052793, filed Oct. 11, 2017.
Written Opinion of the International Searching Authority dated Dec. 18, 2017 for corresponding International Application No. PCT/FR2017/052793, filed Oct. 11, 2017.
Ali Mohammad Hayajneh et al., "Drone Empowered Small Cellular Disaster Recovery Networks for Resilient Smart Cities", 2016 IEEE International Conference on Sensing, Communication and Networking (SECON Workshops), IEEE, Jun. 27, 2016 (Jun. 27, 2016), pp. 1-6, XP033010033.
Chunbo Luo et al., "Communication Provsiion for a Team of Remotely Searching UAVs: A Mobile Relay Approach", 2012 IEEE Globecom Workshops (GC WKSHPS 2012): Anaheim, California, USA, Dec. 3-7, 2012, IEEE, Piscataway, NJ, Dec. 3, 2012 (Dec. 3, 2012), pp. 1544-1549, XP032341615.
Niklas Goddemeier et al., "Evaluation of Potential Fields Mobility Strategies for Aerial Network Provisioning", Globecom Workshops (GC WKSHPS), 2011 IEEE, IEEE, Dec. 5, 2011 (Dec. 5, 2011), pp. 1291-1296, XP032124535.
Ilaria Dalmasso et al., "WiMax Networks, for Emergency Management Based on UAVs", Satellite Telecommunications (ESTEL), 2012 IEEE First AESS European Conference on, IEEE, Oct. 2, 2012 (Oct. 2, 2012), pp. 1-6, XP032296793.

* cited by examiner

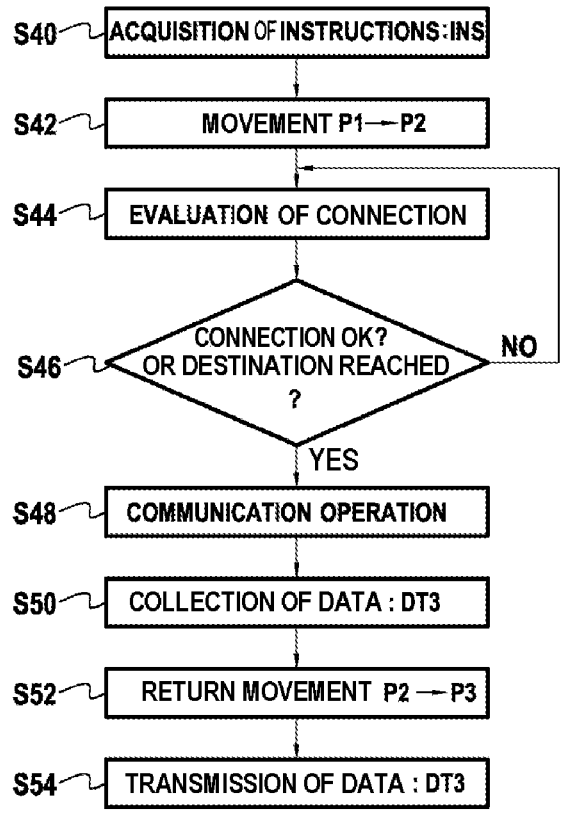

ASYNCHRONOUS SYNCHRONIZATION WITH A MOBILE COMMUNICATION NETWORK

CROSS-REFERENCE TO RELATED APPLICATIONS

This Application is a Section 371 National Stage Application of International Application No. PCT/FR2017/052793, filed Oct. 11, 2017, which is incorporated by reference in its entirety and published as WO 2018/087440 A1 on May 17, 2018, not in English.

BACKGROUND OF THE INVENTION

The present invention lies in the field of mobile telecommunications networks and pertains in particular to the management of communications between a communication terminal and a mobile communication network.

The invention relates in particular to the execution of communication operations with a mobile communication network such as a mobile telephone network or a Wifi network for example.

In a known manner, the user of a mobile telephone absolutely must be situated in a zone of coverage of a relay antenna of the cellular network to which he has subscribed in order to be able to access this network and carry out mobile telephone operations (calls, SMS messaging . . . ). In a non-covered zone, also called a "white zone", the mobile telephone is out of reach of its cellular network, thereby preventing any communication with the outside. However, certain regions of the world (rural zones, country suffering from a lack of infrastructure . . . ) are today poorly served, or indeed not served at all, by local mobile telephone operators, thereby posing a problem for users. This problem becomes, in particular, critical when a user wishes to contact rescue services in an emergency situation.

An approach consists today in using cellular repeaters to extend the range of a cellular telephone, but this technique requires that the repeaters be installed in advance in a fixed manner between the terminal of the user (situated in a white zone) and the closest relay antenna. However, this solution exhibits significant technical constraints related in particular to its installation (limited capabilities of the repeaters, cost of installation, problem of the electrical power supply of the repeaters etc.) and is not appropriate for a roaming user whose position is liable to vary.

The present invention proposes to address in particular the problems described hereinabove and is aimed, in a general manner, at allowing or facilitating a user's access to a mobile communication network, in particular in the case where this user's terminal is situated out of range of the mobile communication network in question.

OBJECT AND SUMMARY OF THE INVENTION

To this effect, the present invention proposes a first control method implemented by a communication device, comprising the following steps:
  acquisition of a current location of an autonomous locomotion craft;
  acquisition of current capabilities of the autonomous locomotion craft;
  selection, on the basis of the current location and of the current capabilities, of a destination point reachable by the autonomous locomotion craft, said destination point being situated in the zone of coverage of a point of access to a mobile communication network; and
  provision, to the autonomous locomotion craft, of a set of instructions specifying the destination point toward which the autonomous locomotion craft should move, and specifying at least one communication operation to be carried out in connection with the mobile communication network.

According to a particular embodiment, the communication device and the autonomous locomotion craft form one and the same device. Stated otherwise, the autonomous locomotion craft plays the role of the communication device such as defined hereinabove. In this case, the autonomous locomotion craft provides itself with, that is to say generates, its own set of instructions specifying the destination point toward which said autonomous locomotion craft must move, and specifying at least one communication operation to be carried out in connection with the mobile communication network.

The invention advantageously allows the user of a communication device (or terminal) to access in an asynchronous manner a mobile communication network from a white zone, that is to say a zone not served by the network in question. An autonomous locomotion craft makes it possible to play the role of relay between the mobile network and a user situated out of range of said network. Diverse communication operations can thus be executed by the autonomous locomotion craft at the request of the user.

The user can advantageously use their communication terminal to command the execution, by an autonomous locomotion craft, of a given mission involving the movement of the craft toward a zone served by the mobile network and the carrying out of at least one communication operation by sending and/or receiving.

According to a particular embodiment, the selection step comprises an identification of a plurality of access points providing, in an associated coverage zone, access to the mobile communication network; the selected destination point being situated in the zone of coverage of one among the plurality of access points. It is thus possible to select the most suitable access point from among a plurality of possible access points, in light of the current position and current capabilities of the autonomous locomotion craft.

According to a particular embodiment, during the selection step, the destination point is an access point selected from among the plurality of access points.

According to a particular embodiment, the selection step comprises a step of preselecting, on the basis of the current location and of the current capabilities of the autonomous locomotion craft, at least one candidate access point from among a plurality of points of access to the mobile communication network; the selected destination point being situated in the zone of coverage of said at least one preselected access point.

The decomposition of the selection step into a preselection step and a final selection makes it possible to limit the calculation resources and the calculation time which are necessary in order to determine the most appropriate destination point. The calculations of paths and the selection of the most appropriate path may be performed just for the zones of coverage of the access points that are closest to the departure point, and that are therefore the most relevant.

According to a particular embodiment, the selection step comprises:
  calculation of possible paths between the current location and candidate destination points situated in the zone of coverage of at least one access point;

estimation, for each calculated path, of a time of movement of the autonomous locomotion craft or of an energy consumption of the autonomous locomotion craft; and selection, from among the calculated paths, of the path exhibiting the lowest movement time or of the path exhibiting the lowest energy consumption.

In this way, it is possible to minimize the necessary path time and/or energy consumption which are required by the autonomous locomotion craft in order to reach a position served by the mobile communication network. The chances of said craft carrying out its mission are thus maximized.

According to a particular embodiment, the selection step is carried out in accordance with predefined criteria taking into account at least one from among:

the distance between the current location of the autonomous locomotion craft and the destination point;

a topology of terrain between the current location and the destination point;

an estimation of the energy consumption of the autonomous locomotion craft between the current location and the destination point;

applicable regulations in respect of movement between the current location and the destination point; and meteorological data.

In this way, it is possible to select the destination point which is most suitable for the case at issue and thus the chances that the autonomous locomotion craft carries out its mission are maximized. The invention makes it possible in particular to select the destination point which is closest or that the autonomous locomotion craft has the most chance of reaching, in view for example of at least one criterion such as defined hereinabove.

According to a particular embodiment, the destination point is selected such that the current capabilities are sufficient for the autonomous locomotion craft to be able to reach the destination point from the current location and carry out said at least one communication operation. The destination point is thus selected as a function of the position and of the capabilities of the autonomous locomotion craft so as to ensure that the autonomous locomotion craft is capable of achieving its mission.

According to a particular embodiment, said at least one communication operation comprises at least one from among:

the dispatching of data via the mobile communication network;

the receiving of data from the mobile communication network; and the transferring of the instructions to another autonomous locomotion craft.

The autonomous locomotion craft can thus send or receive at least one message, of SMS or other type, or else send or receive data of video or multimedia type. The autonomous locomotion craft can also send the current location of the communication device, so that for example the user of said device can be rescued.

In a particular embodiment, the various steps of the first control method are determined by instructions of computers programs.

Consequently, the invention also envisages a computer program on an information medium, this program being able to be implemented in an autonomous locomotion craft, such as a drone for example, or more generally in a computer, this program comprising instructions suitable for the implementation of the steps of the first control method such as defined hereinabove.

The invention also envisages a recording medium (or information medium) readable by a computer, and comprising instructions of a computer program such as is mentioned hereinabove.

Correlatively, the invention relates to a second control method implemented by an autonomous locomotion craft able to communicate with a mobile communication network, comprising the following steps:

acquisition of a set of instructions;

movement of the autonomous locomotion craft toward a destination point specified in the set of instructions, said destination point being situated in the zone of coverage of a point of access to a mobile communication network;

evaluation of a quality of connection between the autonomous locomotion craft and the mobile communication network during said movement;

execution of at least one communication operation, specified in the set of instructions, in connection with the mobile communication network, as soon as one of the following conditions is fulfilled:

(1) the autonomous locomotion craft reaches the destination point; and (2) the connection quality reaches a predetermined threshold level.

As already indicated, the invention advantageously allows a user to access in an asynchronous manner a mobile communication network from a white zone, that is to say a zone not served by the network in question. The autonomous locomotion craft makes it possible to play the role of relay between the mobile network and the user situated out of range of said network. Diverse communication operations can thus be executed by the autonomous locomotion craft at the request of the user.

The set of instructions is for example received from a communication device (a terminal) implementing a control method as defined hereinabove. The user can thus advantageously use their communication terminal to command the execution, by an autonomous locomotion craft, of a given mission involving the movement of the craft toward a zone served by the mobile network and the carrying out of at least one communication operation by sending and/or receiving.

The verification of compliance or non-compliance with conditions (1) and (2) during the movement toward the destination point (periodically or in real time for example) advantageously makes it possible to economize on the resources of the autonomous locomotion craft and to minimize the necessary time required by said craft to carry out its mission.

According to a particular embodiment, said at least one communication operation comprises at least one from among:

the dispatching of data via the mobile communication network;

the receiving of data from the mobile communication network;

the transferring of the instructions to another autonomous locomotion craft.

The autonomous locomotion craft can thus send or receive at least one message, of SMS or other type, or else send or receive data of video or multimedia type. The autonomous locomotion craft can also send the current location of the communication device, so that for example the user of said device can be rescued.

According to a particular embodiment, the method comprises:

carrying out of a time countdown commencing from the start of the movement of the autonomous locomotion craft from the current location to the destination point; and a return movement of the autonomous locomotion craft toward a return point specified in the set of instructions before completion of said at least one communication operation if the time counted down reaches a predetermined threshold time.

This embodiment makes it possible to safeguard the integrity of the drone and allows its return to the user in situations where the capabilities become too poor to allow the total execution of the desired communication operations.

According to a variant embodiment, the method comprises:

evaluation, commencing from the start of the movement of the autonomous locomotion craft from the current location to the destination point, of the remaining energy in a battery of the autonomous locomotion craft; and a return movement of the autonomous locomotion craft toward a return point specified in the set of instructions before completion of said at least one communication operation if said estimation of the remaining energy reaches a predetermined threshold level.

According to a particular embodiment, the method comprises, after completion of said at least one communication operation, a return movement of the autonomous locomotion craft toward a return point specified in the set of instructions. The user can thus recover their autonomous locomotion craft once the mission has been performed.

According to a particular embodiment, the method comprises the following steps:

collection of data on the basis of said at least one communication operation carried out; and transmission of said data to a communication device when said device is situated within transmission range of the autonomous locomotion craft.

This embodiment advantageously allows the user to be informed of the progress of the mission carried out by the autonomous locomotion craft and, if relevant, to receive the data received by this craft when the latter was connected to the mobile communication network.

In a particular embodiment, the various steps of the second control method are determined by instructions of computers programs.

Consequently, the invention also envisages a computer program on an information medium, this program being able to be implemented in a communication device, or more generally in a computer, this program comprising instructions suitable for the implementation of the steps of the second control method such as defined hereinabove.

The invention also envisages a recording medium (or information medium) readable by a computer, and comprising instructions of a computer program such as is mentioned hereinabove.

Note that the computer programs mentioned in the present disclosure can use any programming language, and be in the form of source code, object code, or of code intermediate between source code and object code, such as in a partially compiled form, or in any other desirable form.

Furthermore, the recording mediums mentioned hereinabove can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the recording mediums can correspond to a transmissible medium such as an electrical or optical signal, which can be conveyed via an electrical or optical cable, by radio or by other means. The program according to the invention can be in particular downloaded over a network of Internet type.

Alternatively, the recording mediums can correspond to an integrated circuit in which the program is incorporated, the circuit being adapted to execute or to be used in the execution of the method in question.

The invention also relates to a communication device (or terminal) configured to implement the first control method defined hereinabove. More specifically, the invention relates to a communication device comprising:

a location module configured to acquire a current location of an autonomous locomotion craft;

a capabilities acquisition module configured to acquire current capabilities of the autonomous locomotion craft;

a selection module configured to select, on the basis of the current location and of the current capabilities, a destination point reachable by the autonomous locomotion craft, said destination point being situated in the zone of coverage of a point of access to a mobile communication network; and a command module configured to provide the autonomous locomotion craft with a set of instructions specifying the destination point toward which the autonomous locomotion craft should move, and specifying at least one communication operation to be carried out in connection with the mobile communication network.

The invention also relates to an autonomous locomotion craft, such as a drone for example, configured to implement the second control method defined hereinabove. More specifically, the invention relates to an autonomous locomotion craft comprising:

a module for obtaining a set of instructions;

a control module configured to control the movement of the autonomous locomotion craft toward a destination point specified in the set of instructions, said destination point being situated in the zone of coverage of a point of access to a mobile communication network;

an evaluation module configured to evaluate a quality of connection between the autonomous locomotion craft and the mobile communication network during said movement;

a communication module configured to execute at least one communication operation, specified in the set of instructions, in connection with the mobile communication network, as soon as one of the following conditions is fulfilled:

the autonomous locomotion craft reaches the destination point; and the connection quality reaches a predetermined threshold level.

It will be noted that the various embodiments mentioned hereinabove in conjunction with the first and second methods of control of the invention as well as the associated advantages apply in an analogous manner to the communication device and to the autonomous locomotion craft of the invention such as are defined hereinabove.

According to a particular embodiment, the invention is implemented by means of software components and/or hardware components. In this regard, the term "module" can correspond in this document either to a software component, or to a hardware component or to an assembly of hardware components and software components.

BRIEF DESCRIPTION OF THE FIGURES

Other characteristics and advantages of the invention will become apparent on reading the description which follows, given with reference to the appended drawings in which:

FIG. 5 represents, in the form of a chart, the steps of a first control method implemented by the communication device illustrated in FIG. 1, according to a particular embodiment of the invention;

FIG. 6 represents, in the form of a chart, a variant embodiment of the first control method illustrated in FIG. 5; and FIG. 7 represents, in the form of a chart, the steps of a second control method implemented by the autonomous locomotion craft illustrated in FIG. 1, according to a particular embodiment of the invention.

DETAILED DESCRIPTION OF EMBODIMENTS

As already indicated, the invention relates to the management of communications between a communication terminal and a mobile communication network.

To solve in particular the problem of the user terminal's access to a mobile communication network from a white zone, the present invention proposes to use an autonomous locomotion craft capable of moving from the white zone to a zone covered by the mobile communication network and capable of carrying out appropriate communication operations in connection with said network.

In the present disclosure, a "white zone" designates a zone (or region) which is not covered (or served) by at least one access point of a mobile communication network considered. Stated otherwise, when a subscriber is situated in such a white zone, their communication terminal (their mobile telephone for example) is out of range of the access points of the mobile communication network and therefore cannot communicate with the network in question. Such a white zone may be for example situated in a sparsely inhabited zone (desert, rural zone . . . ) which is not served by the local operators.

Moreover, by "autonomous locomotion craft" is meant, in this disclosure, a craft capable of acquiring instructions and of moving in an autonomous manner on the basis of these instructions. In the exemplary embodiments described hereinafter, the autonomous locomotion craft considered is a drone, that is to say an autonomous aircraft of any type. Once the drone has acquired its instructions, the drone steers toward its destination without any user intervention being necessary to guide the drone.

Among existing drones, it is possible to cite rotary-wing drones such as helicopters, quadricopters and other analogous craft. It is also possible to cite fixed-wing drones, propelled by one or more thermal or electric motors.

It is however understood that the invention applies more generally to any autonomous locomotion craft, including to terrestrial, surface, underwater and analogous autonomous craft.

Unless indicated to the contrary, the elements which are common or analogous to several figures bear the same reference signs and exhibit identical or analogous characteristics, so that for the sake of simplicity these common elements are generally not described again.

Figure 1:
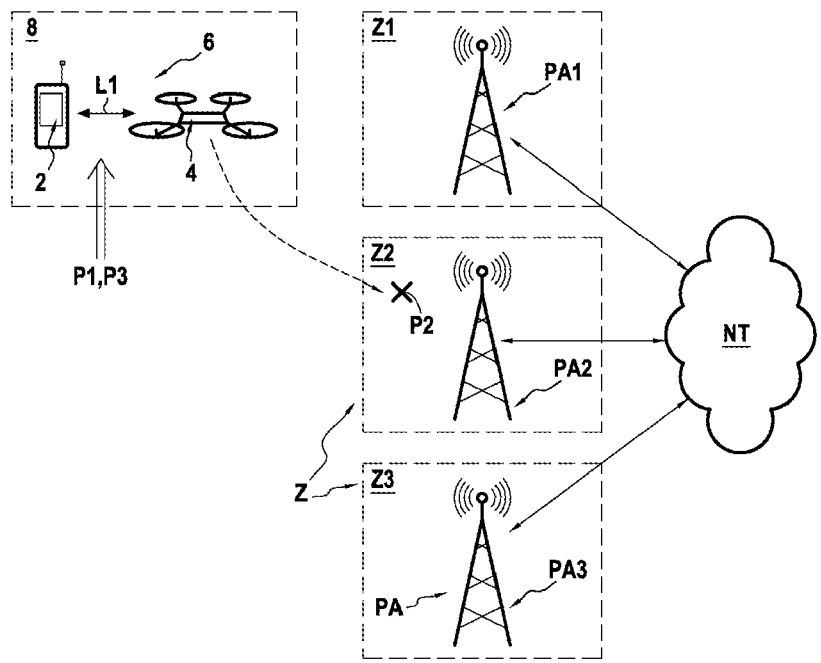
FIG. 1 schematically represents a communication system comprising a communication device and an autonomous locomotion craft which are in accordance with a particular embodiment of the invention.

FIG. 1 represents, in a schematic manner, the structure of a communication system 6 comprising an autonomous drone 4 and a communication terminal (or device) 2 able to cooperate with the autonomous drone 4 via a communication link L1 when the terminal 2 and the drone 2 is situated in proximity.

It will be understood that certain elements generally present in a communication terminal and in a drone have been intentionally omitted since they are not necessary for the understanding of the present invention. Moreover, the system 6 represented in FIG. 1 constitutes merely an exemplary embodiment, other implementations being possible within the framework of the invention. The person skilled in the art will understand in particular that certain elements of the terminal 2 and of the drone 4 are described here only to facilitate the understanding of the invention, these elements not being necessary in order to implement the invention.

As represented in FIG. 1, it is assumed here that the terminal 2 is a mobile telephone capable of communicating with a mobile communication network NT (or cellular network) so as to access services (telephony, Internet etc.) to which the user has subscribed. In this example, access to the cellular network NT is possible via each of the access points PA1, PA2, PA3 (collectively denoted PA), these taking here the form of relay antennas. Each access point PA1-PA3 provides access to the mobile communication network NT in a respective coverage zone (or service zone) Z1-Z3 (collectively denoted Z). Stated otherwise, the terminal 2 must be situated in the appropriate coverage zone Z in order to be able to connect to the corresponding access point PA and thus communicate with the cellular network NT.

For the sake of simplicity, in this example the coverage zones Z are mutually independent. It will however be understood that it is possible that certain coverage zones Z may overlap one another.

The cellular network NT can be any cellular telecommunications network using 2G, 3G, 4G, LTE, 5G, WiMAX or other technologies. According to another example, the mobile communication network NT is a Wifi network.

It is assumed now that the mobile terminal 2 (and its user) is situated in a white zone 8 of the network NT so that no connection is possible between the terminal 2 and one of the access points PA. The implementation of the invention, according to a particular embodiment, allows the user to communicate in an asynchronous manner, on the basis of their mobile terminal 2, with the network NT by way of the drone 4. Accordingly, the drone 4 must acquire instructions, determine on the basis of these instructions a destination point situated in the coverage zone Z of at least one access point PA, move toward this destination point and carry out, as soon as access to the network NT becomes possible, one or more communication operations specified in said instructions.

Figure 2:
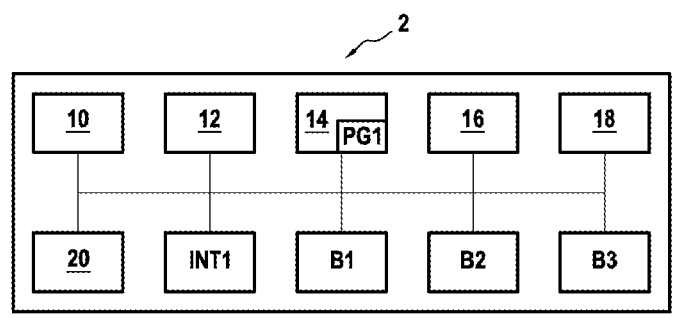
FIG. 2 schematically represents the structure of the communication device illustrated in FIG. 1, according to a particular embodiment of the invention.

FIG. 2 schematically represents the structure of the communication terminal 2 in accordance with a particular embodiment of the invention. As already indicated, the terminal 2 is configured to cooperate with the drone 4 represented in FIG. 1 so as to allow asynchronous communication with the cellular network NT.

More precisely, in this example the terminal 2 comprises at least one processor 10, a rewritable volatile memory 12 (of RAM type), a rewritable nonvolatile memory 14 (of Flash type for example), a communication interface 16 for communicating with the mobile communication network NT, a location unit 18, a man/machine interface 20, a wireless communication interface INT1, and databases (or memories) B1, B2 and B3.

The nonvolatile memory 14 constitutes here a recording medium (or information medium) in accordance with a particular embodiment, readable by the terminal 2, and on which is recorded a computer program PG1 in accordance with a particular embodiment. This computer program PG1 comprises instructions for the execution of the steps of a control method according to a particular embodiment.

The communication interface 16 is for example a 3G or 4G communication interface configured to communicate with the mobile communication network NT when the terminal 2 is situated in the coverage zone ZA1-ZA3 of a corresponding access point PA1-PA3. This communication interface 16 uses for example an embedded subscriber identity module (an SIM card for example) to allow identification and authentication of the user with the network NT.

In the example represented in FIG. 1, the terminal 2 is situated initially in the white zone 8 so that the access points PA are out of range of the communication interface 16.

The location unit 18 (of GPS type for example) is configured to allow the terminal 2 to acquire its current location at a given instant. Embodiments without this location unit 18 are possible however.

The man/machine interface 20, allowing the user to interact with the terminal 2, can comprise a keypad, a touchscreen or non-touch screen etc.

The wireless communication interface INT1 is configured to establish a wireless communication link L1, as represented in FIG. 1, with a corresponding wireless communication interface INT2 (represented in FIG. 3) of the drone 4. In this example, the wireless communication interfaces INT1 and INT2 are configured to establish a short- or medium-range wireless communication link L1, of Bluetooth or Wifi type for example. As explained subsequently, such a communication link L1 allows the terminal 2 to dispatch instructions to the drone 2 and subsequently allows the drone 4 to provide if relevant the terminal 2 with data that it has collected once one or more communication operations have been carried out. The communication between the terminal 2 and the drone 4 therefore requires here that they be situated in proximity, that is to say at a predetermined maximum distance which depends on the case considered.

According to another implementation of the invention, the communication link L1 allowing the terminal 2 and the drone 4 to cooperate is of wired type.

In this example, the terminal 2 furthermore comprises the databases B1, B2 and B3. Other embodiments are possible in which one at least of these databases is not present in the terminal 2. The database B1 catalogs here at least one point of access PA to the mobile communication network NT. In this example, it is assumed that the database B1 identifies the location of each access point PA1-PA3, for example with the aid of geographical coordinates (of GPS or other type). It is considered here that the terminal 2 is able to determine the positions covered by the access points PA on the basis of the location of said access points PA. According to a particular example, the database B1 comprises the location of the coverage zones Z in association with each access point PA.

Figure 3:
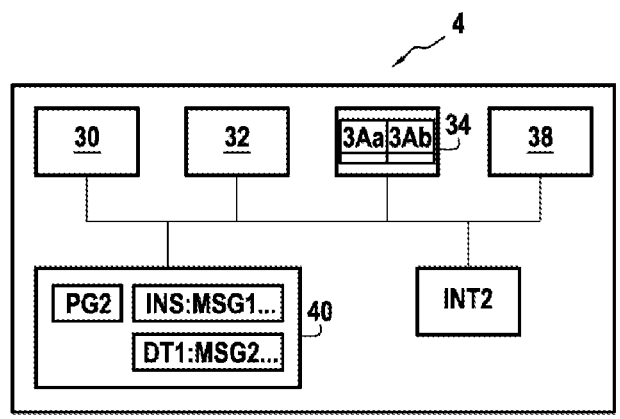
FIG. 3 schematically represents the structure of the autonomous locomotion craft illustrated in FIG. 1, according to a particular embodiment of the invention.

FIG. 3 schematically represents the structure of the drone 4 in accordance with a particular embodiment of the invention. As already indicated, the drone 4 is configured here to move from the white zone 8 of the cellular network NT to a destination point (subsequently denoted P2) specified in instructions provided by the communication terminal 2, this destination point being situated in a coverage zone Z of one of the access points PA, as represented in FIG. 1. The drone 4 is furthermore configured to carry out at least one communication operation with the cellular network NT in response to instructions provided by the terminal 2. As explained subsequently, diverse variant embodiments are possible.

More precisely, in this example, the following elements are embedded aboard the drone 4: a controller 30, propulsion (or movement) instruments of the drone 32, sensors 34, a communication interface 38 for communicating with the mobile network NT, a rewritable nonvolatile memory 40 and a communication interface INT2.

The sensors 34 allow the analysis of the movement (of the flight in the present case) of the drone 4. These sensors 34 comprise a positioning sensor 34a (of GPS type for example) for determining the current location of the drone 4 and an altitude sensor 34b (a barometer for example) for determining the current altitude of the drone 4. Among these sensors 34, may also be found at least one from among: an inertial platform, gyroscopes, accelerometers and a wind analysis sensor (e.g. an anemometer detecting wind speed, a wind direction sensor).

In this example, the propulsion instruments of the drone 32 can comprise a motor, actuators, propellers etc., and more generally any element traditionally enabling a drone to move.

The controller 30 is configured to control the propulsion instruments 32 on the basis of the data received from the sensors 34 so as to cause the movement or the positioning of the drone 4 in accordance with the instructions that it has acquired.

The communication interface 38 is for example a 3G or 4G communication interface configured to communicate with the mobile communication network NT when the drone 4 is situated in a coverage zone ZA1-ZA3 of one of the access points PA1-PA3. This communication interface 38 uses for example an embedded subscriber identity module (an SIM card for example) to allow identification and authentication of the user with the network NT.

In the example represented in FIG. 1, the drone 4 is situated initially in the white zone 8 so that the access points PA are, at this juncture, out of range of the communication interface 38 of the drone 4.

The nonvolatile memory 40 constitutes here a recording medium (or information medium) in accordance with a particular embodiment, readable by the drone 4 (and more particularly by the controller 30), and on which is recorded a computer program PG2 in accordance with a particular embodiment. This computer program PG2 comprises instructions for the execution of the steps of a control method according to a particular embodiment.

In this example, the memory 40 is furthermore configured to store instructions INS1 acquired by the drone 4, as well as data DT1 collected (or obtained) by the drone 4 on the basis of at least one communication operation carried out in connection with an access point PA.

As already indicated with reference to FIGS. 1 and 2, the communication interface INT1 is configured to establish a communication link L1 with the corresponding communication interface INT1 of the terminal 2. It is assumed in this example that the link L1 is a wireless communication link, of Bluetooth or Wifi type for example, such a link being able to be established only if the terminal 2 and the drone 4 are situated sufficiently close to one another. According to another example, the communication link L1 is of wired type.

Figure 4:
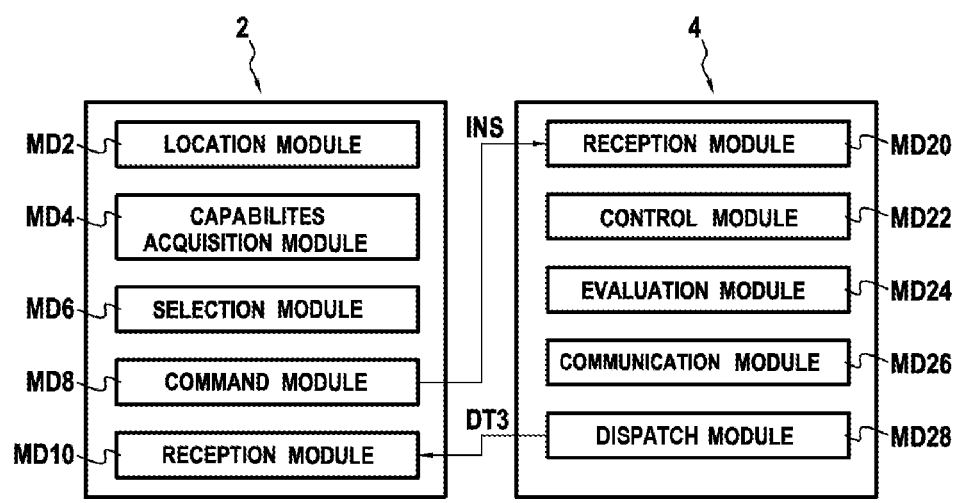
FIG. 4 schematically represents modules implemented by the communication device illustrated in FIGS. 1-2 and by the autonomous locomotion craft illustrated in FIGS. 1 and 3, in accordance with a particular embodiment of the invention.

The processor 10 driven by the computer program PG1 (FIG. 2) implements a certain number of modules represented in FIG. 4 in accordance with a particular embodiment, namely: a location module MD2, a capabilities acquisition module MD4, a selection module MD6, a command module MD8 and a reception module MD10.

More precisely, the location module MD2 is configured to acquire a current location of the drone 4. This current location takes for example the form of geographical coordinates representing the position of the drone 4. The location module MD2 receives for example this current location from the drone 4 which is configured to determine its current position (with the aid here of the positioning sensor 34a) and to transmit this current position to the terminal 2, for example via the communication link L1.

In a particular exemplary embodiment, the location module MD2 acquires the current location of the terminal 2 (for example on the basis of the location unit 18) and, by assuming that the drone 4 is situated in proximity to the terminal 2, the location module MD2 considers that the current location of the drone 4 is approximately the same as that of the terminal 4.

The capabilities acquisition module MD4 is configured to acquire current capabilities of the drone 4. In this example, these current capabilities comprise at least one parameter representative of the current ability of the drone 4 to move and/or to carry out at least one communication operation. The current capabilities of the drone 4 can comprise the current reserve capacity of the drone 4 (for example its energy reserve capacity), this reserve capacity being able to be representative of a state of a battery of the drone 4. The current capabilities can comprise the type of the drone 4 or any other information allowing the terminal 2 to determine the capabilities of the drone 4 to carry out a mission comprising at least one movement and at least one communication operation.

In a particular example, the capabilities acquisition module MD4 is configured to receive the current capabilities from the drone 4, for example via the communication link L1.

The selection module MD6 is configured to select (or determine), on the basis of the current location acquired by the location module MD2 and of the current capabilities acquired by the capabilities acquisition module MD4, a destination point reachable by the drone 4. The destination point thus selected is situated in the coverage zone Z of a point of access PA to the mobile communication network NT. In a particular example, the selection module MD4 is configured to select an access point PA as destination point reachable by the drone 4 in light of its current location and of its current capabilities.

The command module MD8 is configured to transmit to the drone 4 a set of instructions INS specifying the destination point (selected by the selection module MD6) toward which the drone 4 must move, and specifying at least one communication operation to be carried out in connection with the mobile communication network NT. The command module MD8 transmits these instructions INS to the drone 4 via the communication link L1, once the latter has been established.

According to a particular example, the instructions INS dispatched by the command module MD8 specify, as destination point, the location of the access point PA selected by the selection module MD6.

The reception module MD10 is configured to receive, originating from the drone 4, data DT3 collected (or obtained) by the drone 4 on the basis of at least one communication operation carried out in connection with the network NT in accordance with the instructions transmitted beforehand by the command module MD8 of the terminal 2.

Moreover, drone side 4, the controller 30 driven by the computer program PG2 (FIG. 3) also implements modules represented in FIG. 4 in accordance with a particular embodiment, namely: a reception module MD20, a control module MD22, an evaluation module MD24, a communication module MD26 and a dispatch module MD28.

More precisely, the reception module MD20 is configured to acquire the instructions INS which, in this embodiment, are dispatched by the command module MD8 of the terminal 2 via the communication link L1.

The control module MD22 is configured to cause the movement of the drone 4 in an autonomous manner toward the destination point specified in the set of instructions INS, this destination point being situated in the coverage zone Z of an access point PA as already indicated.

In the particular case where the instructions INS received specify, as destination point, the location of an access point PA, the control module is configured to cause the movement of the drone 4 in its coverage zone Z (for example for a distance of less than a threshold value).

The evaluation module MD24 is configured to evaluate a quality of connection between the drone 4 and the mobile communication network NT during said movement caused by the control module MD22. The evaluation of this connection may for example comprise the determination of the transfer bitrate supported by a connection between the drone 4 (more particularly its communication interface 38) and the network NT.

The communication module MD26 is configured to carry out at least one communication operation, specified in the set of instructions INS received by the reception module MD20, in connection with the mobile communication network NT. In the exemplary embodiment described here, the communication module MD26 carries out said at least one communication operation as soon as one of the following conditions is fulfilled:

the drone 4 reaches the destination point specified in the instructions INS; and the connection quality evaluated by the evaluation module MD24 reaches a predetermined threshold level.

A communication operation within the meaning of the invention can comprise at least one from among:

the dispatching of data via the mobile communication network NT; and the receiving of data from the mobile communication network NT.

The data exchanged between the drone 4 and the network NT may be arbitrary, and comprise for example video data, at least one message of SMS or other type, etc.

The dispatch module MD28 is configured to collect (or determine) data DT3 on the basis of said at least one communication operation carried out by the communication module MD26, and to transmit these data DT3 to the terminal 2 when that the latter is situated within transmission range of the drone 4 (i.e. when the communication link L can be restored between the terminal 2 and the drone 4). These data DT3 can comprise for example messages of SMS or other type received by the drone 4.

A particular embodiment is now described with reference to FIGS. 1 to 7. More precisely, the communication terminal 2 implements a control method as illustrated in FIG. 5, by executing the computer program PG1. Likewise, the drone 4 implements a control method as illustrated in FIG. 7, by executing the computer program PG2.

It is assumed in an initial state that the mobile terminal 2 (and its user) is situated at an origin position P1 situated in the white zone 8 of the cellular network NT so that no connection is possible between the terminal 2 and the access points PA. It is furthermore assumed that the drone 4 is situated in proximity to the terminal 2 and to its user. The implementation of the control methods allows the user, on the basis of their mobile terminal 2, to communicate in an asynchronous manner with the cellular network NT by way of the drone 4, as explained hereinafter.

In the course of an acquisition step S2, the terminal 2 performs the acquisition of the current location P1 of the drone 4. In the present case, the terminal 2 obtains data representative of the current location P1 of the drone 4, these data comprising for example geographical coordinates of the drone 4 at the moment of acquisition. The current location P1 of the drone 4 can be estimated on the basis of the current positioning of the terminal 2 (with the aid of its location unit 18) or on the basis of location data determined and transmitted by the drone 4 itself.

In the course of an acquisition step S4, the terminal 2 performs the acquisition of the current capabilities of the drone 4. In this example, the terminal 2 obtains data DT2 representative of the operating reserve capacity of the drone 4 (a battery state for example). On the basis of these data DT2, the terminal 2 is capable of estimating the mission or missions that the drone 4 is capable of carrying out at the present instant. As already indicated, other types of current capabilities are possible however.

The acquisition steps S2 and S4 can be carried out simultaneously or one after the other in any order.

The terminal 2 selects (S6) thereafter, on the basis of the current location P1 and of the current capabilities DT2, a destination point P2 reachable by the drone 4, this destination point P2 being situated in the coverage zone Z of a point of access PA to the mobile communication network NT.

This selection S6 can be carried out in diverse ways. According to a particular example, the terminal 2 selects at S6 the access point PA2 itself as destination point reachable by the drone 4 as a function of the current location and of the current capabilities of the drone 4.

According to a particular example, during selection S6, the terminal 2 identifies a plurality of access points PA providing, in an associated coverage zone Z, access to the network NT. The destination point P2 selected at S6 is then situated in the coverage zone Z of one (at least) of the identified access points. This identification is done for example by consulting the database B1 embedded aboard the terminal T1. In the present case, this identification makes it possible to identify at least the access points PA1-PA3 represented in FIG. 1.

The step S6 of selecting the destination point P2 can be carried out on the basis of at least any one of the following predetermined criteria:

the distance between the current location P1 of the drone 4 and the destination point P2;

a topology of terrain (altitude, relief, type of terrain etc.) between the current location P1 and the destination point P2;

an estimation of the energy consumption (electrical consumption for example) of the drone 4 between the current location P1 and the destination point P2;

applicable regulations in respect of movement between the current location P1 and the destination point P2; and of meteorological data.

The terminal T2 can, for example, consult the database B2 to determine the flight regulation applicable in the zone concerned. Likewise, the terminal T2 can, for example, consult the database B3 to determine the topology of the terrain, and in particular the obstacles which are liable to have an impact on the path of the drone 4 and therefore on the selection S8 of the destination point P2.

During the selection step S6, the terminal 2 can take into account the direction of the wind and/or the strength of the wind, and more generally meteorological data, these elements being obtained by the terminal 2 according to any appropriate manner. According to a particular example, the user enters on the terminal 2 meteorological data relating for example to the direction and/or to the strength of the wind. Such meteorological data can also be received by the terminal 2 in advance (for example when the terminal 2 is situated in a zone covered by an access point PA) and then stored by the latter in a local memory.

More particularly, in the example represented in FIG. 5, the selection step S6 comprises a step S8 of preselection, on the basis of the current location P1 and of the current capabilities DT2 of the drone 4, of at least one candidate access point from among a plurality of point of access to the mobile communication network NT. In the present case, the terminal 2 preselects the access points PA1, PA2 and PA3 in accordance with at least one predetermined criterion. This preselection S8 is carried out here by consulting the database B1 embedded aboard the terminal 2. This preselection S8 consists for example in preselecting the known access points PA situated in the neighborhood of the drone 4 (and therefore also of the user), that is to say the access points PA situated at a distance of less than or equal to a predetermined threshold value with respect to the current position P1 of the drone 4.

Still in the example represented in FIG. 5, the selection step S6 furthermore comprises the final selection (decision step) S10 of the destination point P2, the latter being situated in the coverage zone Z of one of the access points PA1-PA3 preselected at S8. In a particular example, the destination point P2 selected at S10 corresponds to an access point PA from among those preselected at S8.

As represented in FIG. 6, the final selection S10 comprises for example:

a calculation of possible paths (denoted here T1 to T10) between the current location P1 and candidate destination points P2 situated in the coverage zone Z of at least one access point PA1-PA3 preselected at S8;

an estimation, for each calculated path, of a time of movement of the drone 4 or of an energy consumption of the drone 4; and a selection, from among the calculated paths, of the path exhibiting the lowest movement time or of the path exhibiting the lowest energy consumption.

It is thus possible to select the most suitable destination point in light of the current state of the drone 4 (its current location and its current capabilities), of the mission to be carried out and of the specific features of the mobile communication network NT.

Several possible paths can be calculated for one and the same candidate destination point. Paths can also be calculated and compared for several distinct destination points P2.

Since the altitude can have an appreciable impact on the effectiveness of the propellers of the drone 4 (in the case of propulsion by propellers), it may be advantageous to take into account, during the selection step S6, the average altitude of each candidate path T1-T10 considered.

The decomposition of the selection step S6 into a preselection step S8 and a final selection S10 makes it possible to limit the calculation resources and the calculation time that are necessary in order to determine the most appropriate destination point P2, insofar as the calculations of paths and the selection of the most appropriate path are performed only for the access points, or the zones of coverage of the access points PA that are closest to the departure point P1, and that are therefore the most relevant.

However, it is possible to not carry out a preselection S8, and to carry out the final selection S10 on the assembly of access points PA known in the database B1, in accordance with at least one of the criteria envisaged in the present disclosure.

According to a particular example, the terminal 2 selects the destination point P2 such that the current capabilities DT2 of the drone 4 are sufficient for the drone 4 to be able to reach the destination point P2 from the current location P1 and carry out the necessary communication operation or operations. Accordingly, the terminal 2 estimates for example a necessary duration required for the movement of the drone 4 from the departure point P1 to the arrival point P2 as well as the duration necessary for each communication operation to be carried out, and deduces therefrom a minimum duration of reserve capacity required in order to carry out a mission considered, while optionally including therein an additional safety duration.

According to a particular example, during the selection step S6, the destination point P2 is selected such that the drone 4 can reach, after completion of the communication operation or operations to be carried out, a return point P3 distinct from the destination point P2 (FIG. 1). In this way, the user can in particular recover their drone 4. In the example considered here, the return point P3 is the departure point P1. In this case, the terminal 4 takes for example into account an estimation of the necessary duration required for the return movement of the drone 4 from the destination point P2 to the return point P3.

According to a particular example, during the selection step S6, the destination point P2 is selected such that the drone 4, after completion of the communication operation or operations to be carried out, does not have sufficient capabilities to get back to a return point, such as the origin point P1 for example. Otherwise, the destination point is selected (S6) independently of the capability or not of the drone 4 to return to its departure point once the communication operation or operations have been performed. This configuration makes it possible to appreciably increase the range of action of the drone 4, in a critical case for example where an emergency message must be dispatched via the network NT.

Once the destination point P2 has been selected (S6), the terminal 2 generates (S12) a set of instructions INS and transmits (S14) this set of instructions INS to the drone 4 via the communication link L1 established beforehand as represented in FIG. 1.

The set of instructions INS specifies the destination point P2, selected in S6, toward which the drone 4 must move, and furthermore specifies at least one communication operation to be carried out in connection with the mobile communication network NT.

It is assumed here that the set of instructions INS specifies a destination point P2 situated in the coverage zone Z2 of the access point PA2 and defines, as communication operation to be carried out, a send communication operation and a receive communication operation, namely: the dispatching of a message MSG1 of SMS type and the receiving of a message MSG2 of SMS type (for example in response to the message MSG1 dispatched). This, however, constitutes only a nonlimiting example, diverse send and/or receive communication operations being possible.

As illustrated in FIG. 7, the drone 4 receives the set of instructions INS sent by the terminal 2 during an acquisition step S40.

The drone 4 thereafter processes (S40) these instructions S42 and deduces therefrom the destination point P2 to be reached. In the example considered here, it is the terminal 2 which has calculated the path to be followed to reach the destination point P2, this path being specified in the instructions INS received. This makes it possible to exploit the processing power available at the level of the communication terminal 2. Other implementations are however possible, according to which the path is calculated by the drone 4.

In the course of a movement step S42, the drone 4 moves from the departure point P1 to the destination point P2.

As already indicated, in a particular example, the destination point P2 specified in the instructions INS may be the access point PA2 itself. In this case, the drone 4 moves toward the access point PA2 and has this access point or its neighborhood as destination, so as to reach the associated coverage zone Z2.

The drone 4 evaluates (S44) a quality of connection between said drone 4 and the mobile communication network NT during the movement S42. The drone 4 determines (S46) furthermore whether at least one of the following conditions is satisfied:

(1) the drone 4 reaches the destination point P2; and (2) the connection quality reaches a predetermined threshold level.

As soon as one at least of the above conditions (1) and (2) is satisfied, the drone 4 carries out (S48) the communication operations specified in the set of instructions INS, in connection with the mobile communication network NT.

In a first example, the drone 4 detects (S46) that condition (2) is satisfied before having reached the destination point P2. In this case, the drone 4 starts (S48) immediately the communication operations specified in the instructions INS. The drone 4 may come to a standstill in order to execute the communication operations or, if relevant, simultaneously continue its movement toward the destination point P2 if the connection quality can or must still be improved. In a particular case, the drone 4 may succeed in establishing a connection with an access point different from the target access point PA2, for example if an unknown access point is encountered unexpectedly by the drone 4 during its movement toward the destination point P2.

In a second example, the drone 4 reaches the destination point P2 without having detected beforehand that condition (2) is satisfied. The drone 4 then attempts to establish (S48), from the destination point P2, a connection with the mobile communication network NT via the access point PA2. If a connection is successfully established, the drone 4 carries out (S48) the communication operations specified in the instructions INS.

The verification of compliance or non-compliance with conditions (1) and (2) during the movement toward the destination point P2 (periodically or in real time) advantageously makes it possible to economize on the resources of the drone 4 and to minimize the necessary time required for the drone 4 to carry out its mission.

At S48, the drone 4 dispatches for example the message MSG1 via the network NT and receives, from the network NT, a message MG2. In a particular example, the drone 4 dispatches at S48 the current location P1 thereby allowing a third-party to locate the user and, if necessary, come to their aid.

After completion of the communication operations, the drone 4 can perform (S52) a return movement toward a return point P3 specified in the set of instructions INS. The user can thus recover the drone 4 once the mission has been performed.

If, having once arrived at the destination point P2, the drone 4 fails to connect to the mobile communication network NT, the drone 4 abandons the communication operations and moves to the return point P3 specified in the set of instructions INS.

According to a particular example, the drone 4 performs a countdown of the time counting from the start of the movement S44 from the departure point P1 to the destination point P2, and performs the return movement toward the return point P3 specified in the set of instructions INS before completion of the communication operations specified in the instructions INS if the time counted down reaches a predetermined threshold time. This variant makes it possible to safeguard the integrity of the drone 4 and to allow its return to the user in situations where the capabilities of the drone become too poor to allow the complete execution of the desired communication operations.

According to a particular example, the drone 4 performs an evaluation, counting from the start of the movement of the autonomous locomotion craft from the current location to the destination point, of the remaining energy of the autonomous locomotion craft (for example in a battery of said craft); and performs the return movement toward the return point P3 specified in the set of instructions INS before completion of the communication operations specified in said set of instructions INS if the estimation of the remaining energy reaches (becomes less than or equal to) a predetermined threshold level.

According to a particular example, the drone 4 furthermore collects or determines (S50) data DT3 on the basis of the communication operations carried out at S48. These data DT3 can comprise data received from the network NT (a message of SMS type for example) or logging data representative of the operations carried out by the drone 4 (type of operation, date and time, status of the operation indicating a failure or a success etc.). The drone 4 can subsequently transmit (S54) the data DT3 to the terminal 2 when the latter is sufficiently close to the drone 4 and establishes a communication link L1. According to a particular example, the drone 4 undertakes the transmission (S54) of the data DT3 as soon as it has reached the return point P3. This variant advantageously allows the user to be informed of the progress of the mission carried out by the drone 4 and, if relevant, receive the data received by the drone 4 when the latter was connected to the network NT.

In the exemplary embodiments hereinabove, the processing necessary for the selection S6 of the destination point P2 is carried out terminal side 2 so as to exploit the processing resources available at the level of the terminal 2. Other implementations are however possible, in which some at least of steps S2, S4 and/or S6 is carried out by the drone 4 itself. In this case, at least one from among the location module MD2, the capabilities acquisition module MD4 and the selection module MD6, such as are described hereinabove with reference in particular to FIG. 4, can be included in the drone 4.

In a particular example, the drone 4 and the terminal 2 form one and the same device. Stated otherwise, the drone 4 also plays the role of terminal 2 such as described previously. The drone 4 then also constitutes a communication terminal (or device) within the meaning of the invention. In this case, the user interacts directly with the drone 4 without calling upon a distinct terminal to command the drone. The drone 4 itself then carries out the steps of acquiring its current location (S2) and its current capabilities (S4), the selection step (S6) and obtains (or generates) its own instructions (S12) for performing the mission desired by the user. In this case, the autonomous locomotion craft can comprise the location module MD2, the capabilities acquisition module MD4 and the selection module MD6, such as are described hereinabove with reference in particular to FIG. 4.

According to a particular implementation, the access point PA selected at S6 is a second autonomous locomotion craft such as a second drone for example. This second drone exhibits for example a structure analogous to that of the drone 4 described hereinabove and is in particular capable of receiving instructions so as to carry out a mission analogous to that executed by the drone 4 in the previous examples. In a particular case, it is possible to envisage using a chain (or a grid) of drones making it possible to transmit instructions pairwise to a final drone which is in charge of carrying out the communication operations with the mobile communication network NT. In this particular implementation, the drone 4 can therefore carry out at S48 (FIG. 7), as communication operation, the transfer of the instructions INS to another drone. This other drone then carries out, on the basis of the instructions INS received, a control method analogous to that carried out by the drone 4 according to steps S40-S48, and furthermore carries out steps S52 and/or S54 if it is the final drone of the chain.

The invention advantageously allows the user of a communication terminal to access in an asynchronous manner a mobile communication network from a white zone, that is to say a zone not served by the network in question. An autonomous locomotion craft makes it possible to play the role of relay between the mobile network and a user situated out of range of said network. Diverse communication operations can thus be executed by the autonomous locomotion craft at the request of the user.

The user can advantageously use their communication terminal to command the execution, by an autonomous locomotion craft, of a given mission involving the movement of the craft toward a zone served by the mobile network and the carrying out of at least one communication operation by sending and/or receiving.

A person skilled in the art will understand that the embodiments and variants described hereinabove merely constitute nonlimiting examples of implementation of the invention. In particular, the person skilled in the art will be able to envisage any adaptation or combination of the embodiments and variants described hereinabove so as to address a very particular need.

The invention claimed is:

1. A control method implemented by a communication device, comprising:
   acquiring a current location of an autonomous locomotion craft;
   acquiring current capabilities of the autonomous locomotion craft;
   selecting, on the basis of the current location and of the current capabilities, a destination point reachable by the autonomous locomotion craft, said destination point being situated in the coverage zone of a point of access to a mobile communication network; and
   providing, to the autonomous locomotion craft, of a set of instructions specifying the destination point toward which the autonomous locomotion craft should move, and specifying at least one communication operation to be carried out in connection with the mobile communication network.

2. The method as claimed in claim 1, in which the selecting the destination point comprises identifying a plurality of access points providing, in an associated coverage zone, access to the mobile communication network;
   the selected destination point being situated in the zone of coverage of one among the plurality of access points.

3. The method as claimed in claim 1, in which the selecting comprises preselecting, on the basis of the current location and of the current capabilities of the autonomous locomotion craft, at least one candidate access point from among a plurality of point of access to the mobile communication network;
   the selected destination point being situated in the coverage zone of said at least one preselected access point.

4. The method as claimed in claim 1, in which the selecting comprises:
   calculating possible paths between the current location and candidate destination points situated in the zone of coverage of at least one access point;
   estimating, for each calculated path, of a time of movement of the autonomous locomotion craft or of an energy consumption of the autonomous locomotion craft; and
   selecting, from among the calculated paths, of the path exhibiting the lowest movement time or of the path exhibiting the lowest energy consumption.

5. The method as claimed in claim 1, in which the selecting is carried out in accordance with predefined criteria taking into account at least one from among:
   the distance between the current location of the autonomous locomotion craft and the destination point;
   a topology of terrain between the current location and the destination point;
   an estimation of the energy consumption of the autonomous locomotion craft between the current location and the destination point;
   applicable regulations in respect of movement between the current location and the destination point; and
   meteorological data.

6. The method as claimed in claim 1, in which the destination point is selected such that the current capabilities are sufficient for the autonomous locomotion craft to be able to reach the destination point from the current location and carry out said at least one communication operation.

7. The method as claimed in claim 1, in which said at least one communication operation comprises at least one from among:
   dispatching data via the mobile communication network;
   receiving data from the mobile communication network; and
   transferring of the instructions to another autonomous locomotion craft.

8. A control method implemented by an autonomous locomotion craft able to communicate with a mobile communication network (NT), comprising:
   acquiring a set of instructions;
   moving the autonomous locomotion craft toward a destination point specified in the set of instructions, said destination point being situated in the coverage zone of a point of access to a mobile communication network;
   evaluating a quality of connection between the autonomous locomotion craft and the mobile communication network during said movement;
   executing at least one communication operation, specified in the set of instructions, in connection with the mobile communication network, as soon as one of the following conditions is fulfilled:
      the autonomous locomotion craft reaches the destination point; and
      the connection quality reaches a predetermined threshold level.

9. The method as claimed in claim 8, in which said at least one communication operation comprises at least one from among:
   dispatching data via the mobile communication network;
   receiving data from the mobile communication network; and
   transferring of the instructions to another autonomous locomotion craft.

10. The method as claimed in claim 8, in which the method comprises:
    carrying out of a time countdown commencing from a start of movement of the autonomous locomotion craft from the current location to the destination point; and
    returning movement of the autonomous locomotion craft toward a return point specified in the set of instructions before completion of said at least one communication operation if the time counted down reaches a predetermined threshold time.

11. The method as claimed in claim 8, in which the method comprises, after completion of said at least one communication operation, a return movement of the autonomous locomotion craft toward a return point specified in the set of instructions.

12. The method as claimed in claim 11, comprising:
    collecting data on the basis of said at least one communication operation carried out; and
    transmitting said data to a communication device when said device is situated within transmission range of the autonomous locomotion craft.

13. A non-transitory computer-readable medium comprising a computer program stored thereon, comprising instructions for executing a method when said program is executed by a processor of a communication device, the instructions configuring the communication device to perform acts comprising:
    acquiring a current location of an autonomous locomotion craft;
    acquiring current capabilities of the autonomous locomotion craft;
    selecting, on the basis of the current location and of the current capabilities, a destination point reachable by the autonomous locomotion craft, said destination point being situated in the coverage zone of a point of access to a mobile communication network; and providing, to the autonomous locomotion craft, of a set of instructions specifying the destination point toward which the autonomous locomotion craft should move, and specifying at least one communication operation to be carried out in connection with the mobile communication network.

14. A communication device comprising:

a processor; and a non-transitory computer-readable medium comprising instructions stored thereon, which when executed by a processor of the communications device, configure the communications device to:

acquire a current location of an autonomous locomotion craft;

acquire current capabilities of the autonomous locomotion craft;

select, on the basis of the current location and of the current capabilities, a destination point reachable by the autonomous locomotion craft, said destination point being situated in the coverage zone of a point of access to a mobile communication network; and provide the autonomous locomotion craft with a set of instructions specifying the destination point toward which the autonomous locomotion craft should move, and specifying at least one communication operation to be carried out in connection with the mobile communication network.

15. An autonomous locomotion craft comprising:

a processor; and a non-transitory computer-readable medium comprising instructions stored thereon, which when executed by a processor of the autonomous locomotion craft, configure the autonomous locomotion craft to:

obtain a set of instructions;

control the movement of the autonomous locomotion craft toward a destination point specified in the set of instructions, said destination point being situated in the coverage zone of a point of access to a mobile communication network;

evaluate a quality of connection between the autonomous locomotion craft and the mobile communication network during said movement;

execute at least one communication operation, specified in the set of instructions, in connection with the mobile communication network, as soon as one of the following conditions is fulfilled:

the autonomous locomotion craft reaches the destination point; and the connection quality reaches a predetermined threshold level.

\* \* \* \* \*